(12) United States Patent
Turull et al.

(10) Patent No.: US 12,045,605 B2
(45) Date of Patent: Jul. 23, 2024

(54) METHOD FOR UPDATING APPLICATIONS IN CLOUD ENVIRONMENTS

(71) Applicant: Telefonaktiebolaget LM Ericsson (publ), Stockholm (SE)

(72) Inventors: Daniel Turull, Solna (SE); Erik Halen, Luleå (SE); Pontus Sköldström, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 45 days.

(21) Appl. No.: 17/757,563

(22) PCT Filed: Feb. 21, 2020

(86) PCT No.: PCT/SE2020/050204
§ 371 (c)(1),
(2) Date: Jun. 17, 2022

(87) PCT Pub. No.: WO2021/167507
PCT Pub. Date: Aug. 26, 2021

(65) Prior Publication Data
US 2023/0022646 A1 Jan. 26, 2023

(51) Int. Cl.
*G06F 8/656* (2018.01)
*G06F 9/54* (2006.01)

(52) U.S. Cl.
CPC ........... *G06F 8/656* (2018.02); *G06F 9/54* (2013.01)

(58) Field of Classification Search
CPC .................................. G06F 8/656; G06F 9/54
USPC ................................................. 717/168–174
See application file for complete search history.

(56) References Cited

U.S. PATENT DOCUMENTS

| 7,886,120 B1 | 2/2011 | Tormasov | |
| 8,407,694 B2* | 3/2013 | Chen | G06F 8/61 717/169 |
| 8,544,016 B2* | 9/2013 | Friedman | G06F 11/3664 717/124 |

(Continued)

OTHER PUBLICATIONS

Jafari et al, "Dependency Update Strategies and Package Characteristics", ACM, pp. 1-29 (Year: 2023).*

(Continued)

*Primary Examiner* — Anil Khatri
(74) *Attorney, Agent, or Firm* — Nicholson De Vos Webster & Elliott LLP

(57) ABSTRACT

A method performed by a computer to update a runtime environment of an application of the computer via a communications network, wherein a filesystem of the runtime environment comprises one or more layers, wherein at least one layer of the one or more layers comprises a link layer formed by a plurality of packages and wherein the link layer comprises symbolic links indicative of the packages forming an updated layer. The method comprising receiving, from a user device or from a scheduling unit, a first signal indicative of a command to use the updated layer of the one or more layers, obtaining the updated layer, obtaining packages forming the updated layer, from a local cache or from a shared storage or from an image repository node, and updating the runtime environment by replacing a layer of the one or more layers with the updated layer using the obtained packages.

16 Claims, 10 Drawing Sheets

(56) References Cited

U.S. PATENT DOCUMENTS

| | | | | |
|---|---|---|---|---|
| 8,549,514 | B2* | 10/2013 | Carteri | G06F 8/61 |
| | | | | 717/177 |
| 9,455,876 | B1* | 9/2016 | Grebenschikov | H04L 41/20 |
| 9,917,865 | B2* | 3/2018 | Arora | H04L 67/563 |
| 10,489,138 | B1* | 11/2019 | Wu | H04L 41/0853 |
| 10,514,905 | B1* | 12/2019 | Montgomery | G06F 21/54 |
| 10,558,455 | B1* | 2/2020 | Ross | G06F 8/658 |
| 10,657,586 | B1* | 5/2020 | Wookey | G06Q 40/00 |
| 11,304,035 | B1* | 4/2022 | Antemijczuk | H04L 67/562 |
| 11,726,764 | B2* | 8/2023 | Joshi | G06F 21/6218 |
| | | | | 717/169 |
| 11,782,691 | B2* | 10/2023 | Sangameswaran | H04L 67/34 |
| | | | | 717/173 |
| 2017/0109148 | A1 | 4/2017 | Tejani et al. | |
| 2018/0095973 | A1 | 4/2018 | Huang et al. | |
| 2018/0189121 | A1 | 7/2018 | Jobi et al. | |
| 2018/0349150 | A1 | 12/2018 | Wong et al. | |
| 2019/0235897 | A1 | 8/2019 | Goel | |
| 2019/0354389 | A1 | 11/2019 | Du et al. | |
| 2020/0356354 | A1* | 11/2020 | Mitra | G06F 16/903 |

OTHER PUBLICATIONS

Fan et al, "OPS: Offline Patching Scheme for the Images Management in a Secure Cloud Environment", IEEE, pp. 587-594 (Year: 2013).*

Weißbach et al, "Decentralized Coordination of Dynamic Software Updates in the Internet of Things", IEEE, pp. 171-176 (Year: 2016).*

Bhattacharya et al "Dynamic Updates for Web and Cloud Applications", ACM, pp. 21-25 (Year: 2010).*

Abdel-Rahman et al, "A Dynamic Model for automatic Updating cloud computing SLA (DSLA)", ACM, pp. 1-7 (Year: 2016).*

Neamtiu et al, "Cloud Software Upgrades: Challenges and Opportunities", IEEE, pp. 1-10 (Year: 2011).*

International Search Report and Written Opinion for Application No. PCT/SE2020/050204, Nov. 9, 2020, 11 pages.

Aaron Lehmann et al., "Instantly share code, notes, and snippets," Mar. 11, 2020, 9 pages, downloaded from https://gist.github.com/aaronlehmann/b42a2eaf633fc949f93b#id-definitions-and-calculations.

Chunyi Peng et al., "VDN: Virtual Machine Image Distribution Network for Cloud Data Centers," 2012, pp. 181-189, Proceedings IEEE Infocom.

Neil Brown, Overlay Filesystem, Sep. 30, 2019, downloaded from https://www.kernel.org/doc/Documentation/filesystems/overlayfs.txt.

European Search Report and Search Opinion, EP App. No. 20919454.7, Sep. 25, 2023, 11 pages.

International Preliminary Report on Patentability, PCT App. No. PCT/SE2020/050204, Sep. 1, 2022, 8 pages.

Marko Luksa, "Kubernetes in Action", 2017, 628 pages, Manning Publications Co.

Shaya Potter et al., "Improving Virtual Appliance Management through Virtual Layered File Systems", 2011, 14 pages.

* cited by examiner

METHOD FOR UPDATING APPLICATIONS IN CLOUD ENVIRONMENTS

CROSS-REFERENCE TO RELATED APPLICATIONS

This application is a National stage of International Application No. PCT/SE2020/050204, filed Feb. 21, 2020, which is hereby incorporated by reference.

TECHNICAL FIELD

The present invention relates to a method for providing or updating a runtime environment of an application of a computer via a communications network. In particular, for updating applications running in a container runtime environment of a cloud server.

BACKGROUND

Applications and/or services are frequently provided using cloud technology. Commonly a central cloud is connected to a communications network and is providing applications and services to devices coupled to and/or connected to the communications network.

Containers, container namespaces, container runtime environments or run spaces solve several different problems when running applications in a cloud environment. One of the problems is how to distribute software or software updates to multiple machines/servers operating in the cloud environment. The correct and expected behavior of an application typically depends heavily on its runtime environment or run space, which comprises mainly files in the filesystem, such as configuration-, data-, library files, etc., and other applications running that the main application may communicate with, e.g. application providing various services. There are also other things that affect the behavior, such as environment variables, functionality provided by the kernel, etc.

The possible number of variations of a runtime environment as a whole, when provided and installed in all nodes of a cloud environment, is almost infinite. The variations depend not only on exactly which components are installed, e.g. libraries, but also which versions of those components that are installed. Further, the variations depend on the installed kernel, installed configuration files, etc. For a software developer and distributor of applications this means that it is nearly impossible to make sure that the application will run as expected or display the expected behavior, without testing the application in an infinite number of different runtime environments.

Conventional methods solve this problem by packaging the application together with its environment, as an image file. The image or image file is then a snapshot of the filesystem and services together with which the application has been tested.

While there are some things in the environment that still may change when the application is run (in particular, the kernel version and configuration, which is not comprised in the image file), it reduces the number of possible runtime environments from an infinite number to a considerably smaller number, thereby increasing the probability of the application to display an expected behavior.

Most conventional systems for creating the container images generates a series of layers, generated from a list of commands.

Thus, there is a need for an improved method for distributing applications and/or runtime environments, in particular for nodes in cloud environments.

SUMMARY OF THE INVENTION

The above described drawbacks are overcome by the subject matter described herein. Further advantageous implementation forms of the invention are described herein.

According to a first aspect of the invention the objects of the invention is achieved by a computer implemented method performed by a computer configured to update an application of the computer and/or a runtime environment of the application via a communications network, wherein the filesystem of the runtime environment comprises one or more layers, wherein at least one layer of the one or more layers comprises a link layer formed by a plurality of packages, wherein the link layer comprises symbolic links indicative of the packages forming the updated layer, the method comprising receiving, from a user device or from a scheduling unit, a first signal indicative of a command to use an updated layer of the one or more layers, obtaining the updated link layer, obtaining packages forming the updated layer, from a local cache or from a shared storage or from an image repository node, updating the runtime environment by replacing a layer of the one or more layers with the updated layer using the obtained packages.

The advantage of the first aspect is at least that time and required communication network bandwidth can be reduced when providing or updating a runtime environment in a cloud environment.

According to a second aspect of the invention the objects of the invention is achieved by a computer configured to update a runtime environment of a comprised application via a communications network, wherein the runtime environment comprises a plurality of hierarchical layers, wherein each layer of the plurality of hierarchical layers is formed by a plurality of packages, the computer comprising processing circuitry, a memory comprising instructions executable by the processing circuitry, causing the processing circuitry to perform the method according to the first aspect.

According to a third aspect of the invention the objects of the invention is achieved by a computer program comprising computer-executable instructions for causing a node, when the computer-executable instructions are executed on processing circuitry comprised in the node, to perform any of the method steps according to the first aspect.

According to a fourth aspect of the invention the objects of the invention is achieved by a computer program product comprising a computer-readable storage medium, the computer-readable storage medium having the computer program according to the third aspect embodied therein.

According to a fifth aspect of the invention the objects of the invention is achieved by a carrier containing the computer program according to claim 9, wherein the carrier is one of an electronic signal, optical signal, radio signal, or computer readable storage medium.

The advantages of the second to the fifth aspect of the invention is at least the same as for the first aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly

BRIEF DESCRIPTION OF THE DRAWINGS

FIG. 1 illustrates a Docker file method.

Figure 1:
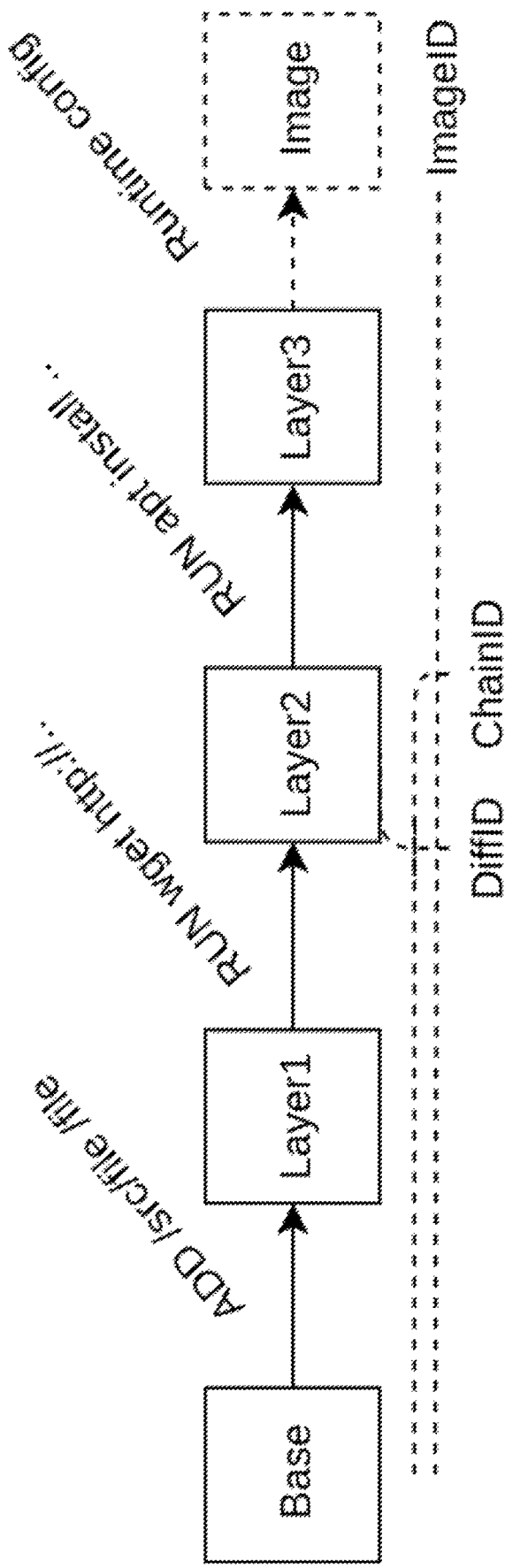
FIG. 1 illustrates a conventional method of building an image.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present disclosure relates in particular to distributed systems operating in virtualized environments, such as providing cloud computing services. In such systems seamless dynamic software/application evolution becomes a key element in ensuring system security and dependability, as well as maintaining expected behavior of applications. In such virtualized environments, e.g. cloud computing environments, sets of applications run over several virtualized environments or container instances that run in parallel over the same or several physical layers of a computer node.

As explained in the background section, conventional methods ensure dynamic software/application evolution typically by providing image files comprising an application and its entire runtime environment. Other conventional methods replace entire layers of the runtime environment when updates are made.

Both of these conventional methods suffer from drawbacks such as significant upgrade time required and heavy occupancy of communications network bandwidth. The reason being that whole runtime environments and/or layers need to be transferred to all the different nodes in the cloud environment. In other words, large amounts of data need to be transferred to each node in the cloud environment, which requires time and occupies communications network bandwidth.

The present disclosure removes or greatly reduces the drawbacks mentioned above by introducing image files comprising link layers, which reference data rather than comprise the actual data. This has the advantage that it greatly reduces the time and communications network bandwidth required.

Additionally, the present disclosure increases the granularity of the blocks of data that needs to be transferred by breaking up each layer into smaller blocks of data referred to as packages. This has the advantage that it further reduces the time and communications network bandwidth required, as it updates selected parts of layers rather than entire layers.

FIG. 1 illustrates a conventional method of building an image. FIG. 1 illustrates a Docker file method. As can be seen from FIG. 1, each additional layer is added on top of a base layer and any preceding layers. The image is constructed by starting with a base layer and subsequently adding layer 1, layer 2 and layer 3. The end result is then used to build a file system image or image file.

A Docker file is typically used to build an image using a series of commands which can e.g. add files into the image from the host, run commands in the image to install packages using an existing packaging system, download packages from the internet, and others. These depend on the initial base layer, from which the construction is started. This base layer typically contains the minimum things needed in an image, together with a layer management system. Each layer on top of the base layer only contains the difference compared to the previous layers, for example a set of added files, not the files that already exists in the previous layers. This lowers the size of individual layers.

Each of the layers typically have three Identifiers:
1. The DiffID, a hash of the filesystem differences introduced by the layer.
2. The ChainID, a combination of the layers DiffID plus the previous layer ChainID. This uniquely identifies a chain of layers.
3. The ImageID, A combination of the ChainID and other image configuration, uniquely identifying a final image plus the set configuration.

Any layer in a chain, such as the one shown in FIG. 1, can be the base layer of another chain, making it possible to build trees of layers. This is desirable since existing layers can then be reused to form new images and thus save space in storage and network capacity needed to transmit the layers.

Figure 2:
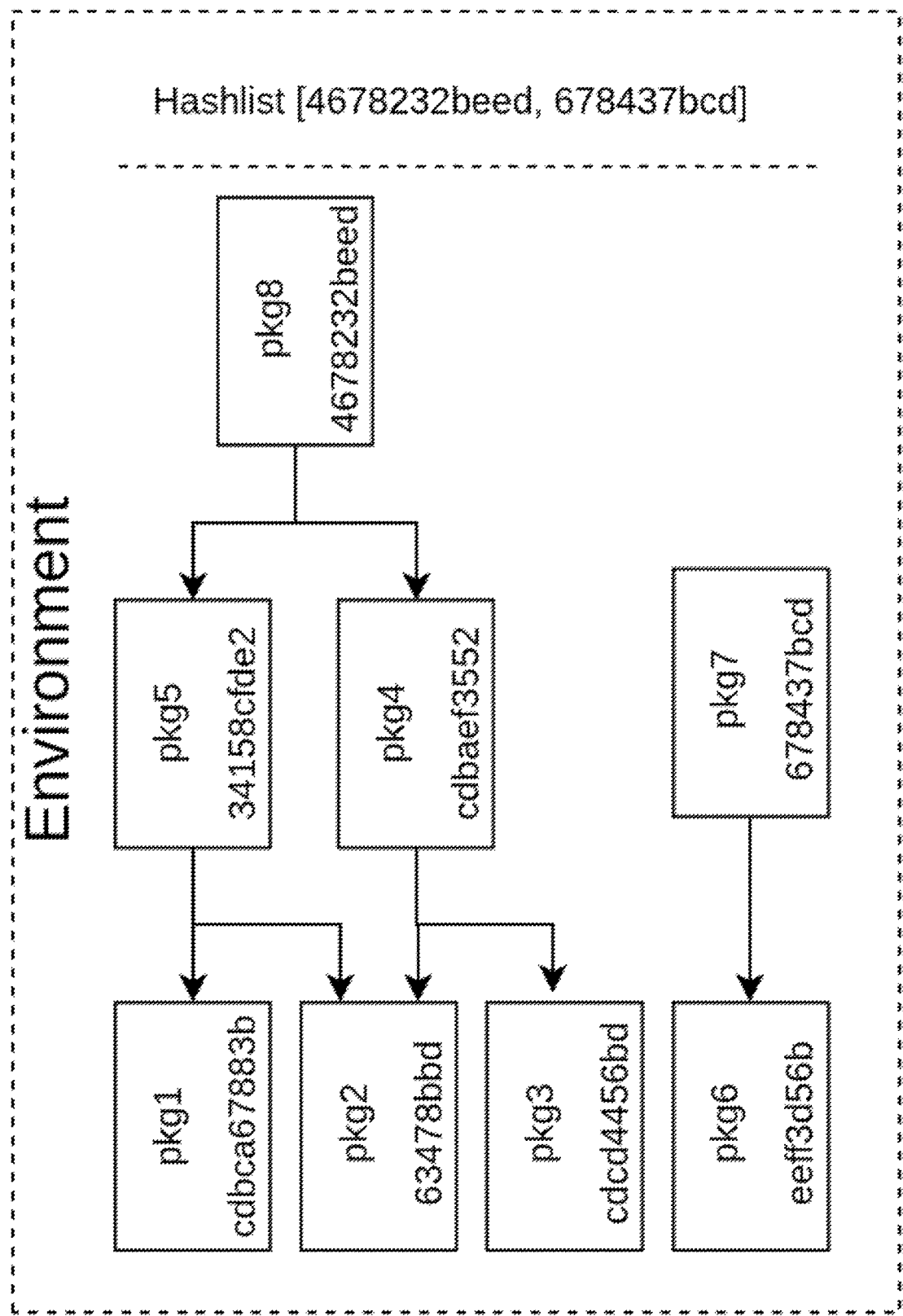
FIG. 2 illustrates a further conventional method for distributing an application.

FIG. 2 illustrates a further conventional method for distributing an application. FIG. 2 illustrates the Nix package method. The Nix package manager takes a similar approach as the Docker file layers, but instead of packing arbitrary filesystem diffs into layers, it packages individual software packages into something like layers, where each software package is isolated from each other. When a package is built, e.g. the apache server, all the external dependencies, compile-time configurations, source code etc. is considered and hashed into a 160-bit cryptographic hash, which identifies the resulting package (like the ChainID/ImageID of a layer above). This results in e.g. a package called e.g. adcb7e7cdd7f7e7e7a7d-apache-server, this package is then installed in a well-defined location on the machine ("/nix/store/"). This makes it possible to install multiple versions of apache-server without colliding, as any other version will have a different hash and be installed in a different directory. Other software packages which are build that depends on apache-server, will depend on exactly this immutable version of apache-server.

This forms the basis of both the Nix and Guix functional package managers. Through similar techniques as the layers, applied on individual packages, they can guarantee that an environment will be identical on a different host, as each individual package depends on completely specified list of other packages. Further, the resulting environment can be described as a list of hashes describing the required packages rather than by the contents of the packages themselves.

A drawback in using such conventional image generation methods, even when built from predefined Docker files, is that the Docker files are snapshots of images containing all the actual files needed to create the runtime environment, and not a description of the environment itself. While Docker files describe how to build the runtime environment, they are not guaranteed to result in the same runtime environment if run twice, on different nodes or at different times, since e.g. packages downloaded remotely could be changed and thus result in a different runtime environment when installed.

The lack of a guarantee of obtaining an expected runtime environment by using the Docker files forces a transfer of a complete runtime environment, where a transfer of the actual environment itself is affected rather than just a transfer of a description of it. The runtime environment (i.e. a unique chain of layers) have a size that can be everything from a few megabytes to giga- or terabytes of data in size.

A drawback with conventional solutions, such as Docker files, is that on a cloud where multiple container applications are running, whole images of a conventional system need to be transferred to all the different nodes in the cloud environment. In other words, large amounts of data need to be transferred to each node in the cloud environment, which requires time and occupies communications network bandwidth.

In an example where it is necessary to update the base image of all nodes, then the image (or the different dependent layers) needs to be transmitted again from the image repository to the nodes serving the applications. When there are millions of applications running this requires a considerable amount of network and storage resources in the machines of the cloud environment. Such conventional overlay filesystem images depend on the layers below of it. If one layer needs to be updated, all the layer depending on it need to be rebuilt and retransmitted, even if the file of the modified layer is irrelevant for the depending layers. Changing a single file in an image will invalidate the whole layer where the file is stored. If this later has upper layer that depend on these layers will be invalidated.

Thus, conventional systems suffer from the drawback of having to transfer large amounts of data when new runtime environments are stored or changes or upgrades to existing runtime environments are made. In other words, providing new or updated runtime environments to the cloud environment will take a long time to complete and will require considerable communications network resources.

The present disclosure provides a solution that addresses the drawbacks mentioned above by providing a link layer referencing packages where each package is hashed and stored in a shared repository which is accessible from the different nodes in the cloud environment. The disclosed container image used for providing or updating and application and/or the respective runtime environment comprises the link layer and links to the packages, having different hashes identifying different versions of the packages. This has the advantage of reducing time and network bandwidth, as only updated packages need to be transferred to the nodes of the cloud environment.

To further improve on the disclosure, the packages may also be locally cached in the nodes of the cloud environment. This has the advantage that if a package is used more than once in the same node, it needs only to be transferred and stored once, independently of how many combinations of layer in the node that uses it.

In other words, the advantages include that packages are transmitted only once, thereby reducing network requirements. Further, the advantages include finer granularity and thus higher reusability of packages, which reduce requirements for network bandwidth and storage requirements in the node or host machine. Further, the advantages include that reproducible environments can be created and guaranteed using only a description/reference by a link layer, not the full raw environments (or layers of raw environments). I.e. a reduction in data transfer and storage is achieved.

Figure 3:
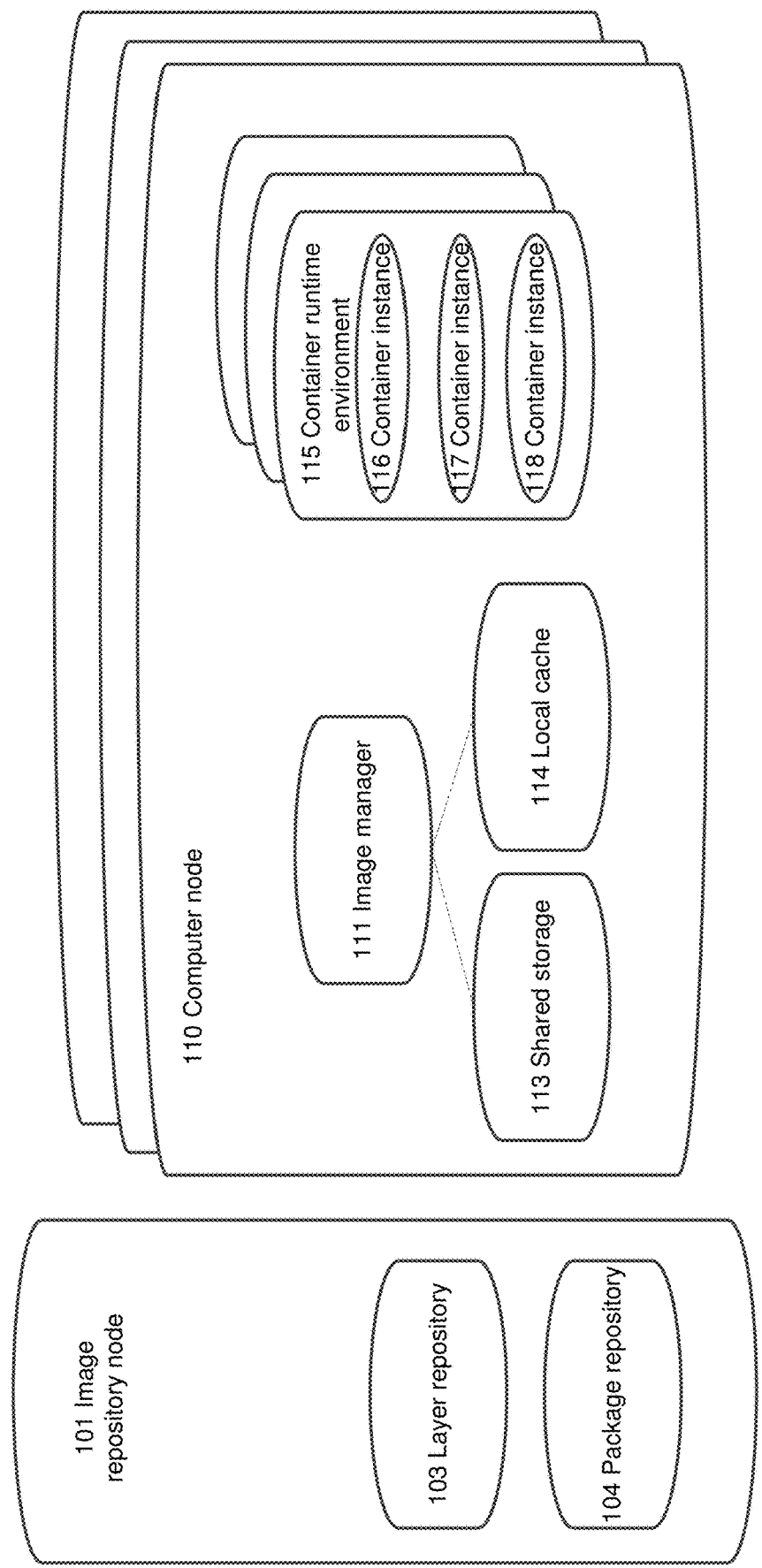
FIG. 3 illustrates nodes in a cloud environment according to one or more embodiments of the present disclosure.

FIG. 3 illustrates nodes in a cloud environment according to one or more embodiments of the present disclosure. FIG. 3 shows the most essential nodes in the cloud environment for performing the method according to the present disclosure. The cloud environment comprises one or more image repository nodes 101 and one or more computer nodes 110. The one or more image repository nodes 101 and the one or more computer nodes are communicatively coupled via a communications network (not shown).

The image repository node 101 comprises one or more layer repositories 103 configured to store different link layers and/or different versions of the link layers. The image repository node 101 further comprises a package repository 104 configured to store different packages and/or different versions of the packages. A package is a collection of files (textual and or binary) and the file's locations on the filesystem that are associate to at least one application.

The computer node 110 may further comprise an image manager 111 and/or a shared storage 113 and/or a local cache 114. Additionally, or alternatively, the computer node 110 further comprises at least one container runtime environment or runtime environment 115. Each container runtime environment or runtime environment 115 further comprises one or more container instances 116-118 executing in the respective runtime environment 115. Each container instance 116-118 typically comprises one or more applications, e.g. applications providing services in the cloud environment.

The image manager 111 or image management agent, is configured to request link layers from the image repository node and/or store updated link layers link layers to the image repository node. Additionally, or alternatively, the image manager 111 comprises a shared storage 113, e.g. being available together with the computer node 110 in a datacenter. Additionally, or alternatively, the image manager 111 comprises a local cache 114 configured to store cached link layer images and packages, typically previously obtained from the layer repository 103 and/or the package repository 104.

In one embodiment, the image repository 101 is comprised in one of the computer nodes 110. In one further embodiment, the image repository 101 is distributed over a plurality of computer nodes 110.

Figure 4:
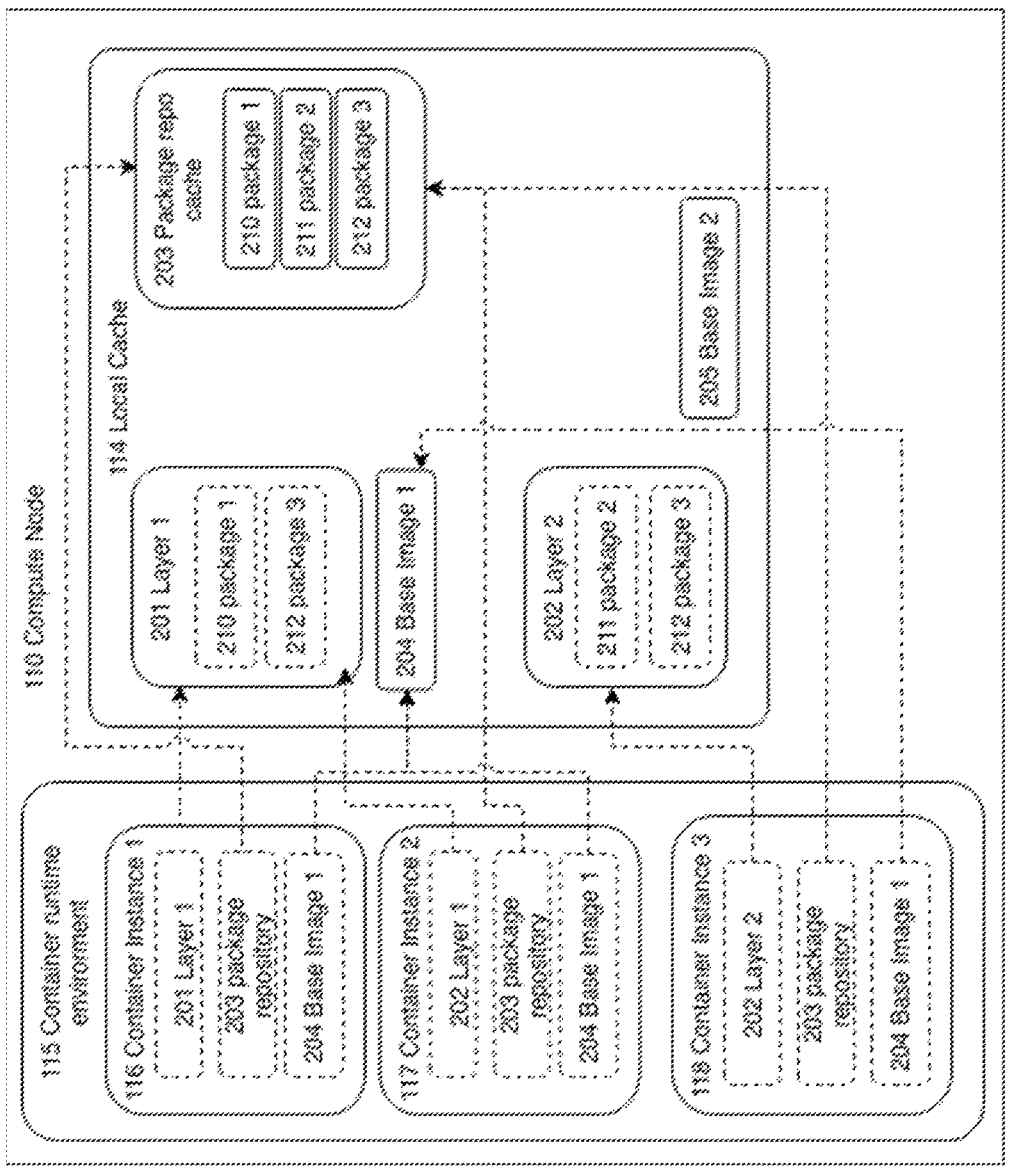
FIG. 4 illustrates relations between containers instances, link layers and packages according to one or more embodiments of the present disclosure.

FIG. 4 illustrates relations between containers instances 116-118, link layers and packages according to one or more embodiments of the present disclosure. In FIG. 4, symbolic links are illustrated with dotted lines.

As previously shown in FIG. 3, several container Instances 116-118 can be configured to execute in the same image/container runtime environment 115.

In FIG. 4, the computer node 110 is shown comprising the least one container runtime environment or runtime environment 115 and the local cache 114. The local cache 114 comprises a local copy of link layer_1 201, link layer_2 202, base image_1 204 and base image_2 205. The local cache 114 further comprises a local package repository cache 203.

Container instances 116-117 comprises a link layer_1 201 and a base Image_1 204. Container Instance_3 118, comprises the same base image_1 204 as container instances 116-117, but differs in that it comprises a different link layer_2 202 comprising different linked packages. As can be seen in FIG. 4, link layer_1 comprises packages 1 and 3, whereas link layer_2 comprises packages 2 and 3.

Each container Instance 116-118 has the local package repository cache 203 mounted, for the packages to be available within the instance.

Each link layer 201, 2020 has one or more pointers or symbolic links to the packages 2010-212, that needs to be included into the package repository path, which is the same path as the one in the 104 package repository. The dashed arrows illustrated symbolic links or mounted directories in the image repository or container instance. The container instances execute their respective applications within the respective container runtime environment 115. The local package repository cache 203 comprises at least one package 210-212, at least one base Image 204-205, which are replicated from the package repository 104 of the image repository node 101. The layers 201-202 are also stored in the Layer Repository 103 of the image repository node, in addition to being stored in the 114 Local Cache. The local package repository cache 203 could also be network mounted directly from the image repository node, thereby removing the need for the local cache 114.

Figure 5:
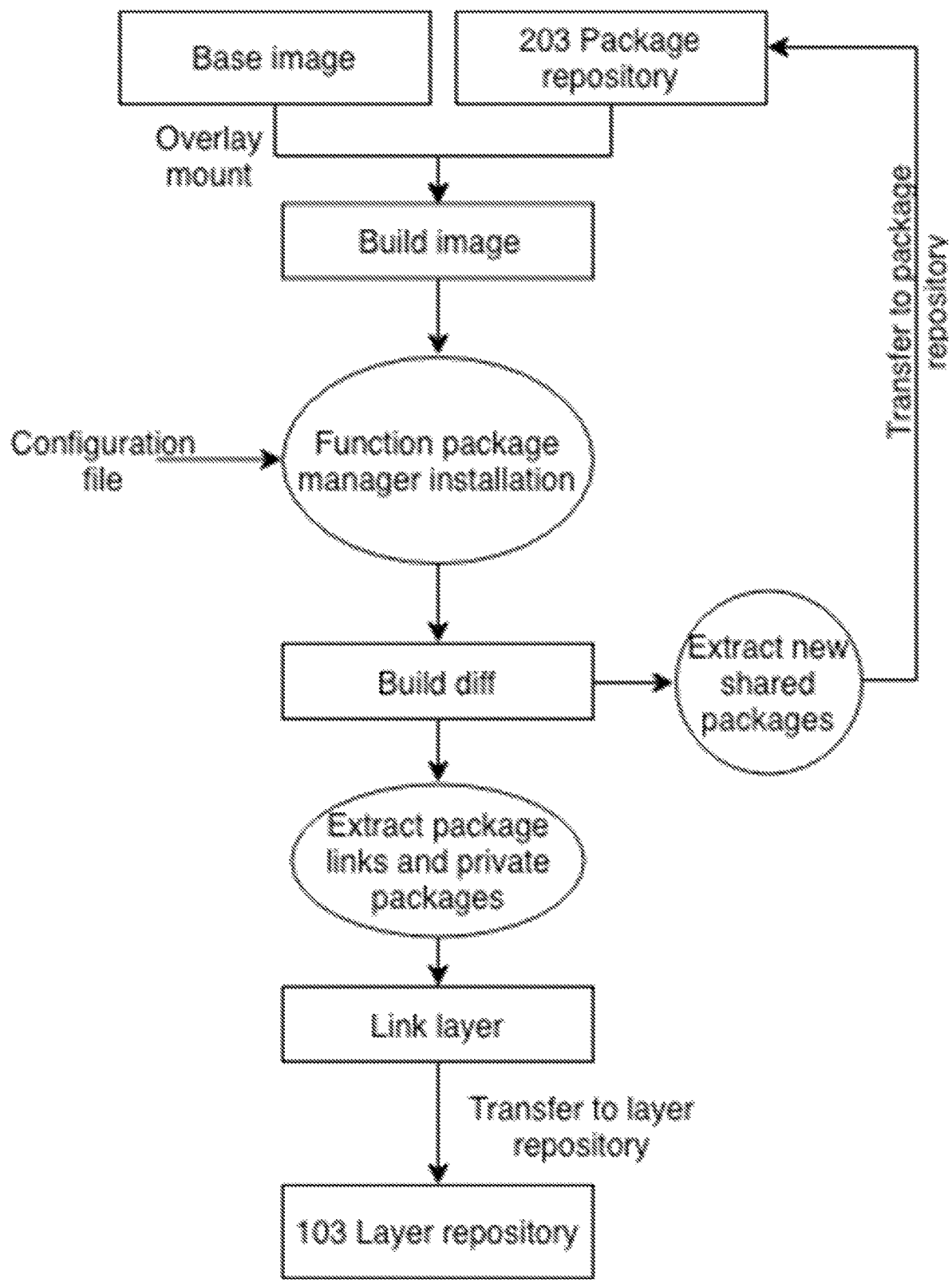
FIG. 5 shows a flowchart for a method according to the present disclosure.

FIG. 5 shows a flowchart for a method according to the present disclosure. The method is performed by the image manager 111 of the computer node 110 interacting with the image repository node 101. The different packages 210-212 are created by adding symbolic links to a location where the package repository is mounted. This avoids including the data into the image. Using the OverlayFS filesystem, it is possible to mount both the base image and the package repository into a single image, while at the same time obtaining the difference after the package installation (the build diff). From the build diff, any new packages needed can be extracted and transferred to the package repository 104 for caching. From the same build diff, the links created by a functional package manager and any private packages, called updated packages, are what is left after shared packages have been extracted. These updated packages form the link layer, which is transferred to the 103 Layer repository.

In one example, a base image is mounted in a first layer. On top of the first layer a second layer is mounted comprising packages comprised in a local package repository. A third empty layer is mounted on top of the second layer. A build image is then generated from the mounted first, second and third layers.

An installation of the application, in a container instance, is performed using a configuration file, e.g. comprising information provided by the user. This will effectively add new packages and symbolic links into the third empty layer. An updated build image can then be generated from the mounted first, second and third (now updated) layers.

A build diff can be determined between the original build image and the updated build image.

Using the build diff, new packages can be extracted and added to the local cache 114 to have them locally available. Package symbolic links and other private packages are also extracted and used to create an updated link layer, which will be transferred to and stored in the layer repository 103 of the image repository node 101. This updated link layer will be available for obtaining the updated layer by other nodes in the cloud environment. Any known mechanism to transfer the information or updated link layer could be used.

In other words, the link layer is created before the execution of the applications in container instances 116-118. One layer is mounted using the base layer image, a second layer is mounted comprising all the packaged of the local cache and a third empty layer is mounted where all packaged relating to changes introduced by the user is stored.

In one example the link layer is obtained by transferring the updated link layer comprising symbolic links to the updated packages from the 103 layer repository into the local cache 114 of the computer node. The updated layer is then mounted on top of the previous layers.

Figure 6:
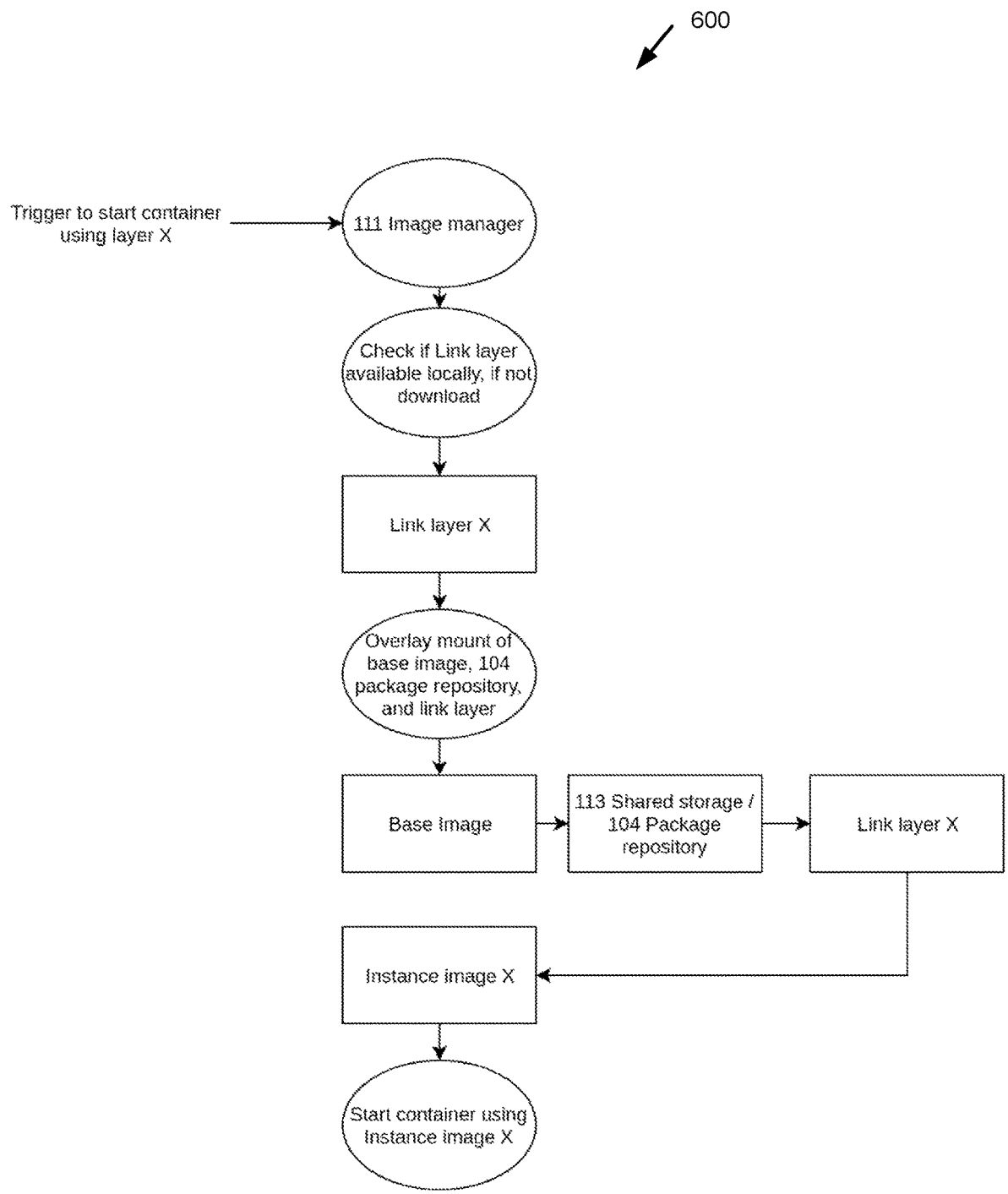
FIG. 6 shows a flowchart for a method to deploy a container instance according to the present disclosure.

FIG. 6 shows a flowchart for a method to deploy a container instance according to the present disclosure. Initially a user device or a scheduling unit comprised within the runtime environment 115 triggers the execution of a first container instance.

The image manager 111 of the computer node 110 receives, from the user device or from the scheduling unit, a first signal S1 indicative of a command to use a new layer X of the one or more layers.

The image manager 111 then checks if the link layer X is locally stored in the local cache 114 of the computer node 110. If not, the missing layer X is obtained by being transferred from the layer repository 103 and stored in the local cache 114, e.g. via a request/response transaction.

The link layer X is then locally available in the computer node 110.

The image manager then overlay-mount the base image, the package repository cache 203 and the link layer. (in the container instances 116-118 that will use the link layers 201-202 and base images 204-205. Symbolic links to packages 210-212 are already defined in the link layer 201-202 and therefore will be automatically available.

This will then create the instance image of link layer X. The computer node 110 can then start the container instance 116-118 using the instance image of link layer X.

When deploying an updated container instance, the method is similar.

The image manager 111 of the computer node 110 receives, from the user device or from the scheduling unit, a first signal S1 indicative of a command to use an updated layer X of the one or more layers.

The image manager 111 then checks if packages comprised and/or referenced by the updated link layer X is already locally stored in the local cache 114 of the computer node 110. If not, the missing packages are obtained by being transferred from the package repository 104 and stored in the local cache 114, e.g. via a request/response transaction.

The updated link layer X is then available in the computer node 110.

The image manager then overlay-mount the base image, the package repository cache 203 and the updated link layer X (in the container instances 116-118 that will use the link layers 201-202 and base images 204-205. Symbolic links to packages 210-212 are already defined in the link layers 201-202 and therefore will be automatically available.

This will then create the instance image of updated link layer X. The computer node 110 can then start the container instance 115 using the instance image of link layer X.

An example comparing conventional methods and the present disclosure is presented below In a first example Docker, OCI images are used.

| Docker/OCI Layer | Hash | Size (mb) |
|---|---|---|
| 0: Base | h1 | 300 |
| 1: Application 1 | h2 + h1 | 100 |

We first add an application to a base layer, to upload it we need to transmit the layer 0 and layer 1, a total of 400 megabytes.

| Docker/OCI Layer | Hash | Size (mb) |
|---|---|---|
| 0: Base | h1 | 300 |
| 1: Application 1 | h2 + h1 | 100 |
| 2: Application 2 | h3 + h2 + h1 | 100 |

Adding another application on top only adds an additional hash, the preceding hashes stay the same, transfer only layer 2 for additional 100 megabytes.

| Docker/OCI Layer | Hash | Size (mb) |
|---|---|---|
| 0: Base | h1 | 300 |
| 1: Application 1 | h2 + h1 | 100 |
| 2: Application 2 | h3 + h2 + h1 | 100 |

If we were to change the order in the build description (e.g. Dockerfile), reversing the order of application 1 and 2, two new layers are created as the hash values change. We need to transfer them both again even though we already sent them in the past. This is 200 megabytes more to transfer.

| Docker/OCI Layer | Hash | Size (mb) |
|---|---|---|
| 0: Base-dbg | h4 | 310 |
| 1: Application 1 | h2 + h4 | 100 |
| 2: Application 2 | h3 + h2 + h4 | 100 |

Modifying the base layer, e.g. by adding a debug package, modifies the hashes of all depending layer, requiring that are all rebuilt and transferred, 510 megabytes.

Hash-indexed container images

| Hash indexed | Hash list | Size (mb) |
|---|---|---|
| 0: Base | H1, H2, H3 | 300 |
| 1: Application 1 | +H4 | 100 |
| Link layer | Links to H1, H2, H3, H4 | <1 |

In the hash-indexed case we start with a base image consisting of some packages (H1-H3) and add another application (H4). We transmit all packages and the Link layer, for a total of slightly above 400 megabytes.

| Hash indexed | Hash list | Size (mb) |
|---|---|---|
| 0: Base | H1, H2, H3 | 300 |
| 1: Application 1 | +H4 | 100 |
| 2: Application 2 | +H5 | 100 |
| Link layer | Links to H1, H2, H3, H4, H5 | <1 |

Adding application 2 requires us to rebuild the link layer and transmit the packages for H5, for slightly more than 100 megabytes.

| Hash indexed | Hash list | Size (mb) |
|---|---|---|
| 0: Base | H1, H2, H3 | 300 |
| 1: Application 2 | +H5 | 100 |
| 2: Application 1 | +H4 | 100 |
| Link layer | Links to H1, H2, H3, H4, H5 | <1 |

Changing the order of application 1 and 2 does not modify the hash list, no need to transmit either the link layer or any packages. Individual packages can be reused in any image, in any order, without needing to be transmitted.

| Hash indexed | Hash list | Size (mb) |
|---|---|---|
| 0: Base-debug | H1, H2, H3, H6 | 310 |
| 1: Application 2 | +H5 | 100 |
| 2: Application 1 | +H4 | 100 |
| Link layer | Links to H1, H2, H3, H4, H5, H6 | <1 |

Modifying the base layer, e.g. by adding debug package H6, only changes the Link layer. Only the link layer needs to be re-built, and transferred together with the H6 package, slightly more than 10 megabytes.

Typically, applications consist of multiple smaller packages than reflected in this example, and thus provide more fine-grained re-usable components than reflected here.

Figure 7:
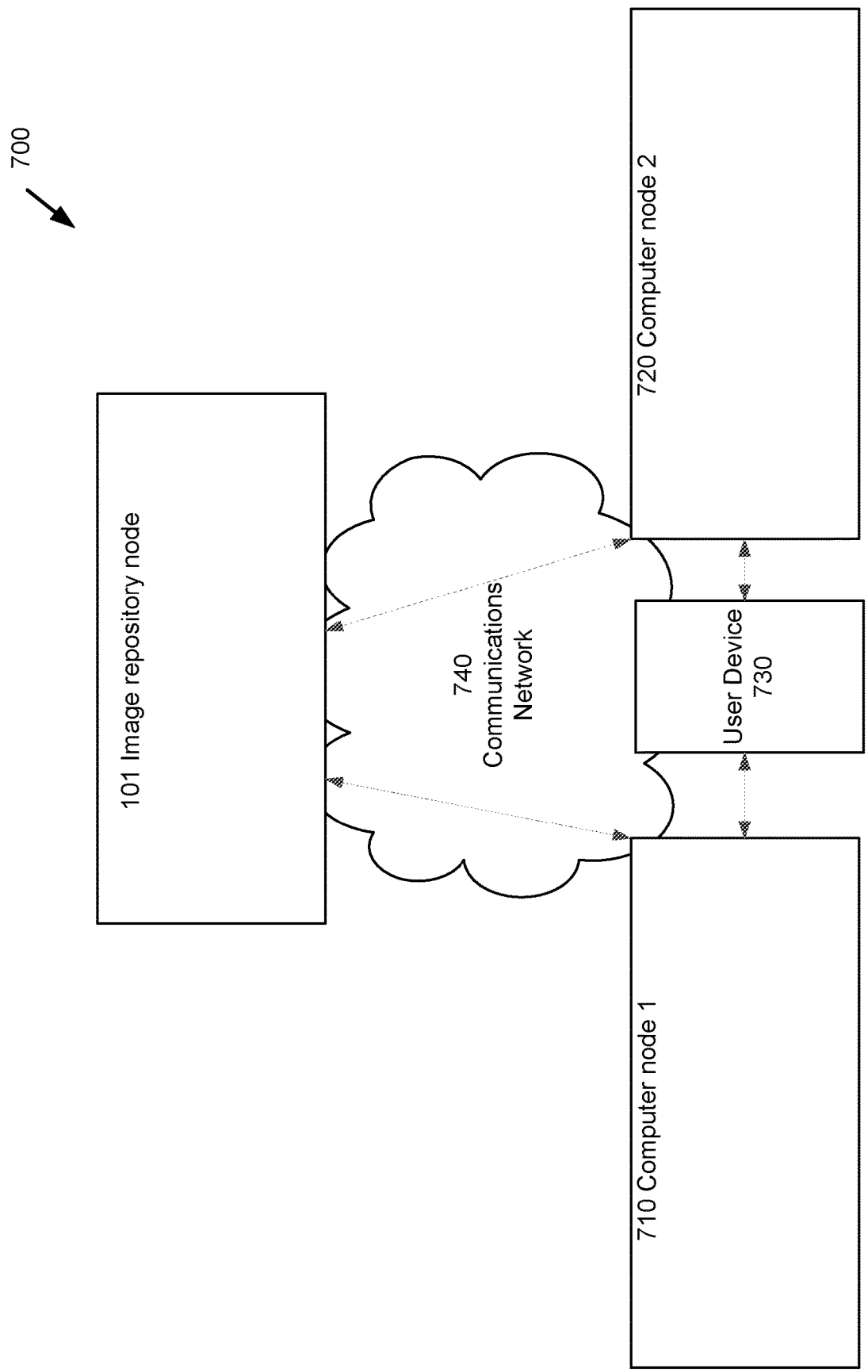
FIG. 7 illustrates a cloud environment according to one or more embodiments of the present disclosure.

FIG. 7 illustrates a cloud environment according to one or more embodiments of the present disclosure. In FIG. 7 the cloud environment comprises an image repository node 101, a first computer node 710, a second computer node 720 and a user device 730. The image repository node 101, the first computer node 710, the second computer node 720 and the user device are communicatively coupled, e.g. via a communications network 740.

In one example, with reference to FIG. 6, the user device 730 triggers an upgrade of a runtime environment of the first computer node 710 by providing a configuration file. As further described in FIG. 6, this results in a new link layer X being transferred and stored in the layer repository 103 of the image repository node 101. The user of the user device 730 then provides input indicating that a container instance using the link layer X should be started on the second computer node 720. This is performed by sending a first signal S1 indicative of a command to use an updated layer of the one or more layers from the user device 730 to the second computer node 720.

Figure 8:
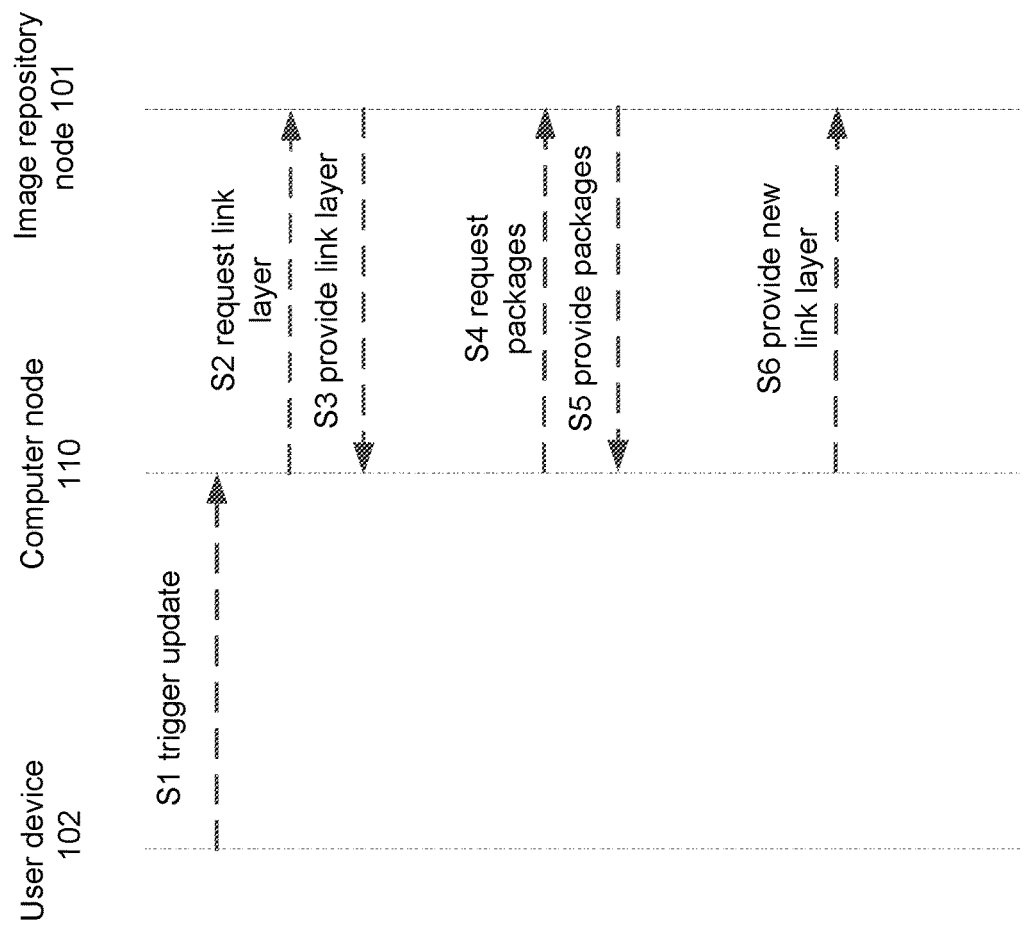
FIG. 8 shows a signalling diagram according to one or more embodiments of the present disclosure.

FIG. 8 shows a signalling diagram according to one or more embodiments of the present disclosure. A user device sends a first signal S1 indicative of a command to use an updated layer of the one or more layers. The computer node then obtains the updated link layer, obtains packages forming the updated layer, and adds the updated layer or updates the runtime environment by replacing a layer of the one or more layers with the updated layer using the obtained packages.

Layers that can be obtained locally are retrieved from the local cache 114.

If one or more link layers cannot be obtained locally, the computer node 110 sends a second signal S2, to an image repository node 101, indicative of a request for a link layer associated to the updated layer of the plurality of hierarchical layers. The computer node 110 then receives a response and/or third signal S3, from the image repository node 101, indicative of the requested updated link layer.

The computer node 110 then determines a first set of packages available in the local cache 114, determining a second set of packages not available in the local cache 114, obtains the first set of packages from the local cache 114 and/or obtains the second set of packages from the shared storage 113 and/or obtains the second set of packages from the package repository 104 of the image repository node 101.

Optionally, if not all of the second set of packages can be obtained from the shared storage 113, the remaining packages from the package repository 104 of the image repository node 101.

In embodiments where the second set of packages is obtained from the image repository node 101, a fourth signal S4, is sent to the image repository node 101, indicative of a request for the second set of packages. A fifth signal S5 is then received from the image repository node 101 indicative of the requested second set of packages.

Optionally, when a user updates a runtime environment of a container instance 116-118 using a configuration file and generates a build image of an updated layer of the plurality of hierarchical layers. The computer node 110 extracts symbolic links from the build image, the symbolic links being indicative of the packages forming the updated layer. The computer node 110 then generates an updated link layer by aggregating the extracted symbolic links and an identity of the updated layer, the identity of the updated layer associating the updated layer to the generated link layer. The computer node 110 then sends a sixth signal S6, to the image repository node 101, indicative of the generated link layer for storage in the layer repository 103.

Figure 9:
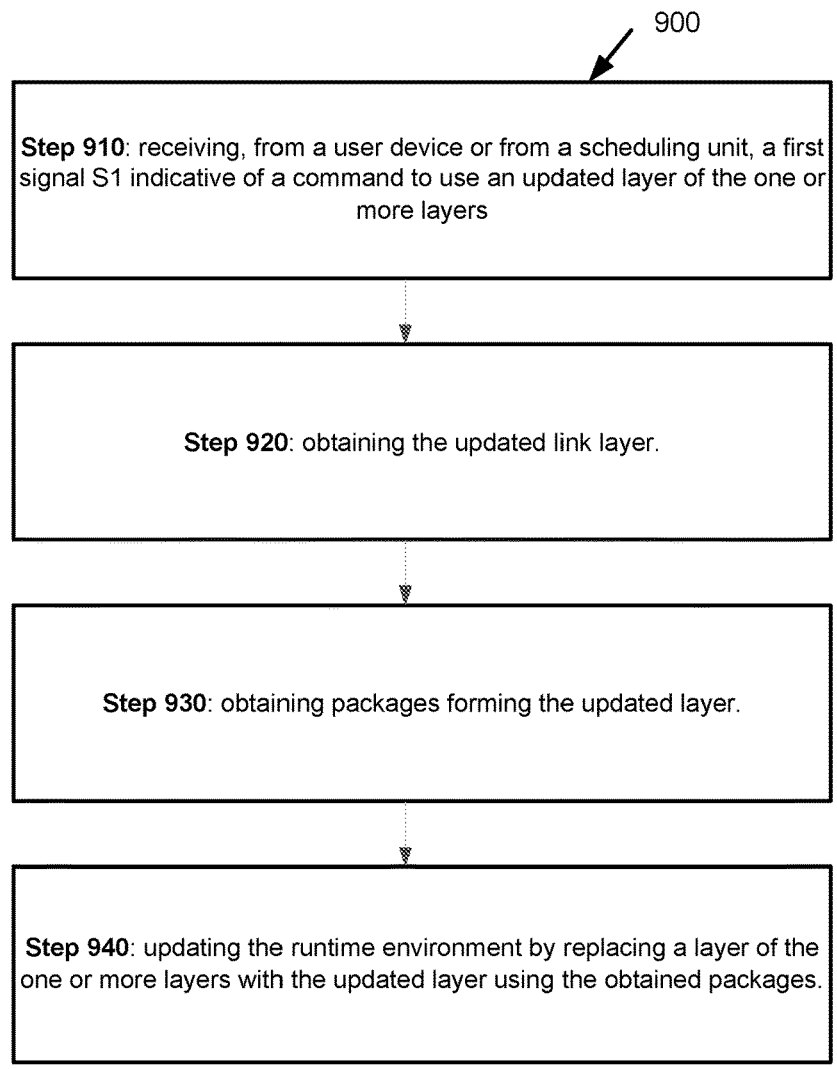
FIG. 9 shows a flowchart of yet a method according to one or more embodiments of the present disclosure.

FIG. 9 shows a flowchart of yet a method according to one or more embodiments of the present disclosure. The method comprises a computer implemented method performed by a computer 110 configured to update an application of the computer 110 and/or a runtime environment of the application via a communications network, wherein the filesystem of the runtime environment comprises one or more layers, wherein at least one layer of the one or more layers comprises a link layer formed by a plurality of packages, wherein the link layer comprises symbolic links indicative of the packages forming the updated layer. The method comprises:

Step 910: receiving, from a user device or from a scheduling unit, a first signal S1 indicative of a command to use an updated layer of the one or more layers. Receiving the signal is further described in relation to FIG. 8.

Step 920: obtaining the updated link layer.

In one example, the updated link layer is available locally and is obtained by retrieving the updated link layer from the local cache 114.

In one further example, the updated link layer is not available locally and is obtained by transferring the updated link layer comprising symbolic links to the packages from the 103 layer repository to the local cache 114 of the compute node 110.

Step 930: obtaining packages forming the updated layer. The packages forming the updated layer may be obtained from the local cache 114 and/or from the shared storage 113 and/or from the package repository 104 of the image repository node 101. The image repository node 101 typically stores the packages int the package repository 104.

Step 940: updating the runtime environment by replacing a layer of the one or more layers with the updated layer using the obtained packages. This may further involve mounting the updated layer on the file system of the compute node 110.

If the updated link layer is not available locally, it is obtained by transferring the updated link layer from the layer repository 103 to the local cache 114 of the compute node 110. The method then further comprises:

Sending a second signal S2, to the image repository node 101, indicative of a request for a link layer associated to the updated layer of the plurality of hierarchical layers, and receiving a third signal S3, from the image repository node 101, indicative of the requested updated link layer.

In some embodiments, the local cache 114 only comprises a subset of the packages referenced by the link layer. The method then further comprises:

Determining a first set of packages available in the local cache 114, determining a second set of packages not available in the local cache 114, obtaining the first set of packages from the local cache 114, and obtaining the second set of packages from the shared storage 113 or from an image repository node 101. Optionally, if not all of the second set of packages can be obtained from the shared storage 113, the remaining packages from the package repository 104 of the image repository node 101.

Additionally, when the second set of packages are obtained from the image repository node 101, the method further comprises:

Sending a fourth signal S4, to the image repository node 101, indicative of a request for the second set of packages and receiving a fifth signal S5, from the image repository node 101, indicative of the requested second set of packages.

In some embodiments, a user updates the runtime environment of the computer node by providing a configuration file. This scenario is further described in relation to FIG. 5. The method then further comprises:

generating a build image or updated build image of an updated layer of the plurality of hierarchical layers, extracting symbolic links from the build image or updated build, the symbolic links being indicative of the packages forming the updated layer.

The method further comprises generating a link layer by aggregating the extracted symbolic links and an identity of the updated layer, the identity of the updated layer associating the updated layer to the generated link layer.

The method further comprises sending a sixth signal S6, to the image repository node 101, indicative of the generated updated link layer. The image repository node 101 then stores the updated link layer in the layer repository 103.

Additionally or alternatively, the plurality of hierarchical layers comprises a base image layer, a link layer and an additional layer, wherein the build image is generated by running an installation of the application using a configuration file, the base image layer and the first link layer by adding packages and links to the second link layer, generating the build image of the updated layer based on the link layer and the additional layer.

According to a further aspect of the disclosure, a computer program is provided and comprising computer-executable instructions for causing a node 101, 110, 710, 720, 730, when the computer-executable instructions are executed on processing circuitry comprised in the node 101, 110, 710, 720, 730, to perform any of the method steps according described herein.

According to a further aspect of the disclosure, a computer program product is provided comprising a computer-readable storage medium, the computer-readable storage medium having the computer program described above embodied therein.

According to a further aspect of the disclosure, a carrier is provided and containing the computer program described above, wherein the carrier is one of an electronic signal, optical signal, radio signal, or computer readable storage medium.

Figure 10:
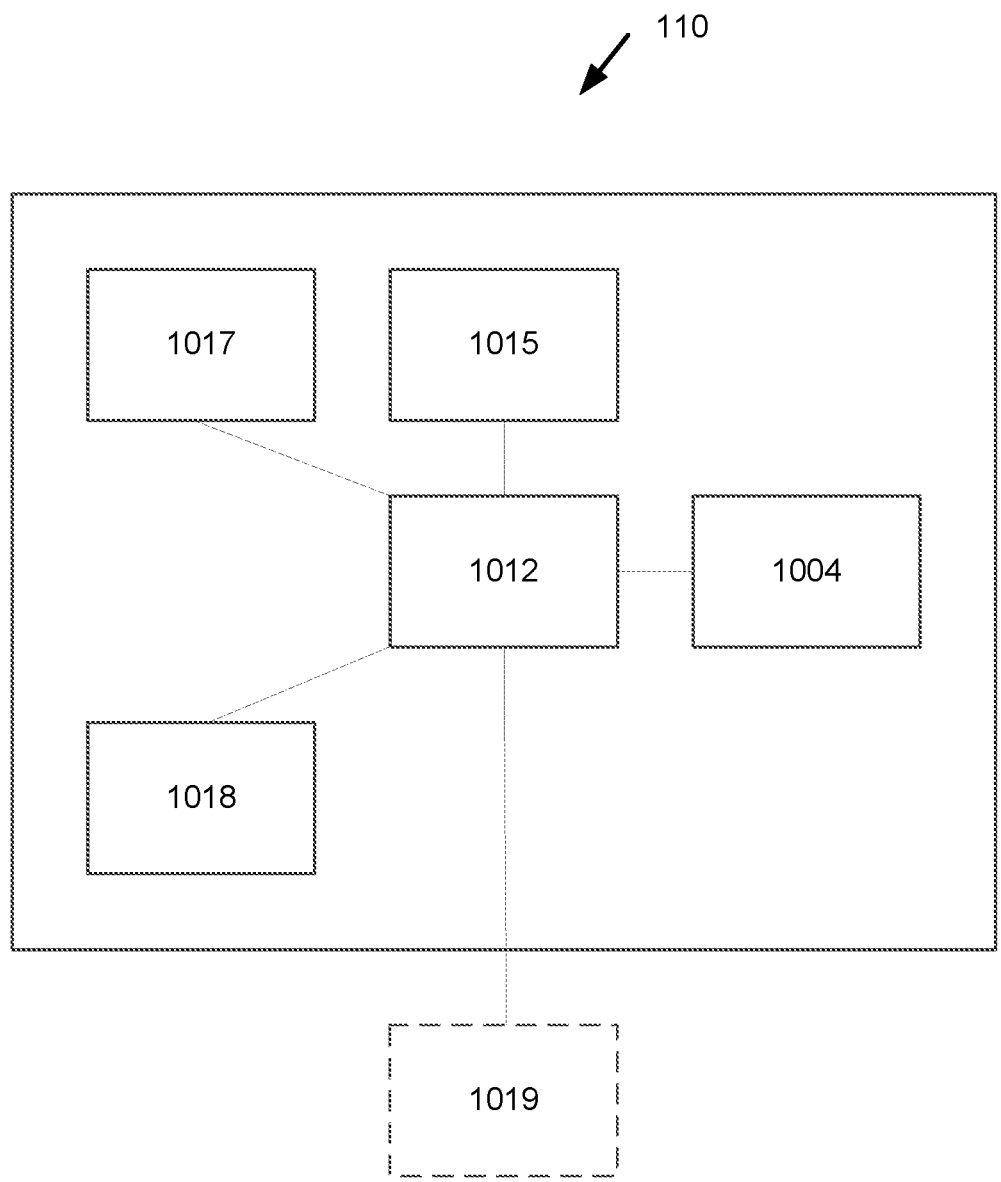
FIG. 10 shows details of a node/computer node according to one or more embodiments of the present disclosure.

FIG. 10 shows details of a node/computer node/computer device 110 according to one or more embodiments of the present disclosure. The computer device 110 may be in the form of a selection of any of network node, a desktop computer, server, laptop, mobile device, a smartphone, a tablet computer, a smart-watch etc. The computer device 110 may comprise processing circuitry 1012. The computer device 110 may optionally comprise a communications interface 1004 for wired and/or wireless communication. Further, the computer device 110 may further comprise at least one optional antenna (not shown in figure). The antenna may be coupled to a transceiver of the communications interface 1004 and is configured to transmit and/or emit and/or receive a wireless signals, e.g. in a wireless communication system.

In one example, the processing circuitry 1012 may be any of a selection of processor and/or a central processing unit and/or processor modules and/or multiple processors configured to cooperate with each-other. Further, the computer device 110 may further comprise a memory 1015. The memory 1015 may contain instructions executable by the processing circuitry 1012, that when executed causes the processing circuitry 1012 to perform any of the methods and/or method steps described herein.

The communications interface 1004, e.g. the wireless transceiver and/or a wired/wireless communications network adapter, which is configured to send and/or receive data values or parameters as a signal to or from the processing circuitry 1012 to or from other external nodes In an embodiment, the communications interface 1004 communicates directly between nodes or via a communications network.

In one or more embodiments the computer device 110 may further comprise an input device 1017, configured to receive input or indications from a user and send a user-input signal indicative of the user input or indications to the processing circuitry 1012.

In one or more embodiments the computer device 110 may further comprise a display 1018 configured to receive a display signal indicative of rendered objects, such as text or graphical user input objects, from the processing circuitry 1012 and to display the received signal as objects, such as text or graphical user input objects.

In one embodiment the display 1018 is integrated with the user input device 1017 and is configured to receive a display signal indicative of rendered objects, such as text or graphical user input objects, from the processing circuitry 1012 and to display the received signal as objects, such as text or graphical user input objects, and/or configured to receive input or indications from a user and send a user-input signal indicative of the user input or indications to the processing circuitry 1012.

In one or more embodiments the computer device 110 may further comprise one or more sensors 1019.

In embodiments, the processing circuitry 1012 is communicatively coupled to the memory 1015 and/or the communications interface 1004 and/or the input device 1017 and/or the display 1018 and/or the one or more sensors 1019.

In embodiments, the communications interface and/or transceiver 1004 communicates using wired and/or wireless communication techniques.

In embodiments, the one or more memory 1015 may comprise a selection of a hard RAM, disk drive, a floppy disk drive, a magnetic tape drive, an optical disk drive, a CD or DVD drive (R or RW), or other removable or fixed media drive.

In a further embodiment, the computer device 110 may further comprise and/or be coupled to one or more additional sensors (not shown) configured to receive and/or obtain and/or measure physical properties pertaining to the computer device or the environment of the computer device, and send one or more sensor signals indicative of the physical properties to the processing circuitry 1012.

It is to be understood that a computer device comprises any suitable combination of hardware and/or software needed to perform the tasks, features, functions and methods disclosed herein. Moreover, while the components of the computer device are depicted as single boxes located within a larger box, or nested within multiple boxes, in practice, a computer device may comprise multiple different physical components that make up a single illustrated component (e.g., memory 1015 may comprise multiple separate hard drives as well as multiple RAM modules).

Similarly, the computer device 110 may be composed of multiple physically separate components, which may each have their own respective components.

The communications interface 1004 may also include multiple sets of various illustrated components for different wireless technologies, such as, for example, GSM, WCDMA, LTE, NR, WiFi, or Bluetooth wireless technologies. These wireless technologies may be integrated into the same or different chip or set of chips and other components within the computer device 110.

Processing circuitry 1012 is configured to perform any determining, calculating, or similar operations (e.g., certain obtaining operations) described herein as being provided by a computer device 110. These operations performed by processing circuitry 1012 may include processing information obtained by processing circuitry 1012 by, for example, converting the obtained information into other information, comparing the obtained information or converted information to information stored in the network node, and/or performing one or more operations based on the obtained information or converted information, and as a result of said processing making a determination.

Processing circuitry 1012 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other computer device 110 components, such as device readable medium, computer 110 functionality. For example, processing circuitry 1012 may execute instructions stored in device readable medium 1015 or in memory within processing circuitry 1012. Such functionality may include providing any of the various wireless features, functions, or benefits discussed herein. In some embodiments, processing circuitry 1012 may include a system on a chip.

In some embodiments, processing circuitry 1012 may include one or more of radio frequency, RF, transceiver circuitry and baseband processing circuitry. In some embodiments, RF transceiver circuitry and baseband processing circuitry may be on separate chips or sets of chips, boards, or units, such as radio units and digital units. In alternative embodiments, part or all of RF transceiver circuitry and baseband processing circuitry may be on the same chip or set of chips, boards, or units In certain embodiments, some or all the functionality described herein as being provided by a computer device 110 may be performed by the processing circuitry 1012 executing instructions stored on device readable medium 1015 or memory within processing circuitry 1012. In alternative embodiments, some or all the functionality may be provided by processing circuitry 1012 without executing instructions stored on a separate or discrete device readable medium, such as in a hard-wired manner. In any of those embodiments, whether executing instructions stored on a device readable storage medium or not, processing circuitry 1012 can be configured to perform the described functionality. The benefits provided by such functionality are not limited to processing circuitry 1012 alone or to other components of computer device 110, but are enjoyed by computer device 110 as a whole, and/or by end users.

Device readable medium or memory 1015 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1012. Device readable medium 1015 may store any suitable instructions, data or information, including a computer program, software, an application including one or more of logic, rules, code, tables, etc. and/or other instructions capable of being executed by processing circuitry 1012 and, utilized by computer device 110. Device readable medium QQ180 may be used to store any calculations made by processing circuitry 1012 and/or any data received via interface 1004. In some embodiments, processing circuitry 1012 and device readable medium 1015 may be considered to be integrated.

The communications interface 1004 is used in the wired or wireless communication of signaling and/or data between computer device 110 and other nodes. Interface 1004 may comprise port(s)/terminal(s) to send and receive data, for example to and from computer device 110 over a wired connection. Interface 1004 also includes radio front end circuitry that may be coupled to, or in certain embodiments a part of, an antenna. Radio front end circuitry may comprise filters and amplifiers. Radio front end circuitry may be connected to the antenna and/or processing circuitry 1012.

Examples of a computer device 110 include, but are not limited to an edge cloud node, a smart phone, a mobile phone, a cell phone, a voice over IP (VoIP) phone, a wireless local loop phone, a tablet computer, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

The communication interface may 1004 encompass wired and/or wireless networks such as a local-area network (LAN), a wide-area network (WAN), a computer network, a wireless network, a telecommunications network, another like network or any combination thereof. The communication interface may be configured to include a receiver and a transmitter interface used to communicate with one or more other devices over a communication network according to one or more communication protocols, such as Ethernet, TCP/IP, SONET, ATM, optical, electrical, and the like). The transmitter and receiver interface may share circuit components, software or firmware, or alternatively may be implemented separately.

In one embodiment, a computer node 110 is provided and is configured to perform any of the method steps described herein.

In one embodiment, computer nodes 110 comprises any one of the nodes 101, 730.

In one embodiment, the image repository node 101 and/or the computer device 730 comprise all or a selection of the features of the computer device/node 110 described in relation to FIG. 10.

In one embodiment, a computer 110 is provided configured to update a runtime environment of a comprised application via a communications network, wherein the runtime environment comprises a plurality of hierarchical layers, wherein each layer of the plurality of hierarchical layers is formed by a plurality of packages, the computer comprising:
  processing circuitry 1012,
  a memory 1015 comprising instructions executable by the processing circuitry 1012, causing the processing circuitry 1012 to perform any of the method steps of the method described herein.

In one embodiment, the computer according to further comprises:
  an image manager 111,
  a local cache 114,
  at least one container runtime environment 115 comprising the runtime environment, wherein the runtime environment comprises a plurality of container instances 116-118.

Finally, it should be understood that the invention is not limited to the embodiments described above, but also relates to and incorporates all embodiments within the scope of the appended independent claims.

The invention claimed is:

1. A method performed by a computer configured to update a runtime environment of an application of the computer via a communications network, wherein a filesystem of the runtime environment comprises one or more layers,
  wherein at least one layer of the one or more layers comprises a link layer formed by a plurality of packages and wherein the link layer comprises symbolic links indicative of the plurality of packages forming an updated layer, the method comprising:
  receiving, from a user device or from a scheduling unit, a first signal indicative of a command to use the updated layer of the one or more layers;
  obtaining the updated layer;
  obtaining packages forming the updated layer, from a local cache, from a shared storage, or from an image repository node;

updating the runtime environment by replacing a layer of the one or more layers with the updated layer using the obtained packages;

generating a build image of the updated layer of a plurality of hierarchical layers;

extracting symbolic links from the build image, the symbolic links being indicative of the packages forming the updated layer;

generating a link layer by aggregating the extracted symbolic links and an identity of the updated layer, the identity of the updated layer associating the updated layer to the generated link layer;

running an installation of the application using a configuration file; and sending a signal to the image repository node, indicative of the generated link layer.

2. The method according to claim 1, further comprising:

sending a second signal, to the image repository node, indicative of a request for a link layer associated to the updated layer of the plurality of hierarchical layers; and receiving a third signal, from the image repository node, indicative of the requested link layer.

3. The method according to claim 2, further comprising:

determining a first set of packages available in the local cache;

determining a second set of packages not available in the local cache;

obtaining the first set of packages from the local cache; and obtaining the second set of packages from the shared storage or from the image repository node.

4. The method according to claim 3, wherein obtaining the second set of packages from the image repository node further comprises:

sending a fourth signal, to the image repository node, indicative of a request for the second set of packages; and receiving a fifth signal, from the image repository node, indicative of the requested second set of packages.

5. The method according to claim 1, wherein the plurality of hierarchical layers comprises a base image layer, a link layer and an additional layer, wherein the build image is generated further by:

running the installation of the application using the configuration file, the base image layer and a first link layer by adding packages and links to a second link layer; and generating the build image of the updated layer based on the link layer and the additional layer.

6. A computer configured to update a runtime environment of an application of the computer via a communications network, wherein the runtime environment comprises a plurality of hierarchical layers, wherein each layer of the plurality of hierarchical layers is formed by a plurality of packages, wherein at least one layer of one or more layers comprises a link layer and wherein the link layer comprises symbolic links indicative of the plurality of packages forming an updated layer, the computer comprising:

processing circuitry; and a memory comprising instructions which, when executed by the processing circuitry, cause the computer to:

receive, from a user device or from a scheduling unit, a first signal indicative of a command to use the updated layer;

obtain the updated layer;

obtain packages forming the updated layer, from a local cache, from a shared storage, or from an image repository node;

update the runtime environment by replacing a layer of the one or more layers with the updated layer using the obtained packages;

generate a build image of the updated layer of the plurality of hierarchical layers;

extract symbolic links from the build image, the symbolic links being indicative of the packages forming the updated layer;

generate a link layer by aggregating the extracted symbolic links and an identity of the updated layer, the identity of the updated layer associating the updated layer to the generated link layer;

run an installation of the application using a configuration file; and send a signal to the image repository node, indicative of the generated link layer.

7. The computer according to claim 6, further comprising:

an image manager; and at least one container runtime environment comprising the runtime environment, wherein the runtime environment comprises a plurality of container instances.

8. The computer according to claim 6, further to:

send a second signal, to the image repository node, indicative of a request for a link layer associated to the updated layer of the plurality of hierarchical layers; and receive a third signal, from the image repository node, indicative of the requested link layer.

9. The computer according to claim 8, further to:

determine a first set of packages available in the local cache;

determine a second set of packages not available in the local cache;

obtain the first set of packages from the local cache; and obtain the second set of packages from the shared storage or from the image repository node.

10. The computer according to claim 9, wherein to obtain the second set of packages from the image repository node is for the computer to:

send a fourth signal, to the image repository node, indicative of a request for the second set of packages; and receive a fifth signal, from the image repository node, indicative of the requested second set of packages.

11. The computer according to claim 6, wherein the plurality of hierarchical layers comprises a base image layer, a link layer and an additional layer, wherein the build image is generated further by operations to:

run the installation of the application using the configuration file, the base image layer and a first link layer by adding packages and links to a second link layer; and generate the build image of the updated layer based on the link layer and the additional layer.

12. A non-transitory computer readable storage medium comprising instructions which, when executed on processing circuitry, cause a computer node to update a runtime environment of an application of the computer node via a communications network, wherein a filesystem of the runtime environment comprises one or more layers, wherein at least one layer of the one or more layers comprises a link layer formed by a plurality of packages and wherein the link layer comprises symbolic links indicative of the plurality of packages forming an updated layer, by performing operations comprising:

receiving, from a user device or from a scheduling unit, a first signal indicative of a command to use the updated layer of the one or more layers;

obtaining the updated layer;

obtaining packages forming the updated layer, from a local cache, from a shared storage, or from an image repository node;

updating the runtime environment by replacing a layer of the one or more layers with the updated layer using the obtained packages;

generating a build image of the updated layer of a plurality of hierarchical layers;

extracting symbolic links from the build image, the symbolic links being indicative of the packages forming the updated layer;

generating a link layer by aggregating the extracted symbolic links and an identity of the updated layer, the identity of the updated layer associating the updated layer to the generated link layer;

running an installation of the application using a configuration file; and sending a signal to the image repository node, indicative of the generated link layer.

13. The non-transitory computer readable storage medium according to claim 12, wherein the computer node to further perform operations comprising:

sending a second signal, to the image repository node, indicative of a request for a link layer associated to the updated layer of the plurality of hierarchical layers; and receiving a third signal, from the image repository node, indicative of the requested link layer.

14. The non-transitory computer readable storage medium according to claim 13, wherein the computer node to further perform operations comprising:

determining a first set of packages available in the local cache;

determining a second set of packages not available in the local cache;

obtaining the first set of packages from the local cache; and obtaining the second set of packages from the shared storage or from the image repository node.

15. The non-transitory computer readable storage medium according to claim 14, wherein obtaining the second set of packages from the image repository node further comprises:

sending a fourth signal, to the image repository node, indicative of a request for the second set of packages; and receiving a fifth signal, from the image repository node, indicative of the requested second set of packages.

16. The non-transitory computer readable storage medium according to claim 12, wherein the plurality of hierarchical layers comprises a base image layer, a link layer and an additional layer, wherein the build image is generated further by:

running the installation of the application using the configuration file, the base image layer and a first link layer by adding packages and links to a second link layer; and generating the build image of the updated layer based on the link layer and the additional layer.

* * * * *